(12) United States Patent
Kubota et al.

(10) Patent No.: US 9,428,026 B2
(45) Date of Patent: Aug. 30, 2016

(54) DAMPER CONTROL DEVICE

(71) Applicant: KABAYA INDUSTRY CO., LTD., Tokyo (JP)

(72) Inventors: Tomoo Kubota, Kanagawa (JP); Masatoshi Okumura, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/765,558

(22) PCT Filed: Mar. 13, 2014

(86) PCT No.: PCT/JP2014/056770
§ 371 (c)(1),
(2) Date: Aug. 3, 2015

(87) PCT Pub. No.: WO2014/142270
PCT Pub. Date: Sep. 18, 2014

(65) Prior Publication Data
US 2015/0367703 A1    Dec. 24, 2015

(30) Foreign Application Priority Data

Mar. 13, 2013  (JP) ................................ 2013-050133

(51) Int. Cl.
| | | |
|---|---|---|
| *B60G 17/0165* | (2006.01) | |
| *B60G 17/015* | (2006.01) | |
| *B60G 17/018* | (2006.01) | |
| *B60G 17/08* | (2006.01) | |

(52) U.S. Cl.
CPC ........ *B60G 17/0165* (2013.01); *B60G 17/015* (2013.01); *B60G 17/018* (2013.01); *B60G 17/08* (2013.01); *B60G 2400/202* (2013.01); *B60G 2500/10* (2013.01)

(58) Field of Classification Search
None
See application file for complete search history.

(56) References Cited

U.S. PATENT DOCUMENTS

| | | | | |
|---|---|---|---|---|
| 2003/0001346 | A1* | 1/2003 | Hamilton | ........... B60G 17/0152 280/5.515 |
| 2011/0025000 | A1* | 2/2011 | Inoue | ................. B60G 17/0157 280/5.507 |
| 2012/0013277 | A1* | 1/2012 | Ogawa | ................... B60G 17/08 318/368 |

FOREIGN PATENT DOCUMENTS

| | | |
|---|---|---|
| JP | H03-227711 A | 10/1991 |
| JP | 2008-238921 A | 10/2008 |
| WO | WO-2011/004471 A1 | 1/2011 |

* cited by examiner

*Primary Examiner* — Thomas Tarcza
*Assistant Examiner* — Garrett Evans
(74) *Attorney, Agent, or Firm* — Rabin & Berdo, P.C.

(57) ABSTRACT

A damper control device controls vibration of an unsprung member by controlling a damping force of a damper interposed between a sprung member and the unsprung member of a vehicle on the basis of a damping property prepared in advance. The damper control device includes a correction unit that extracts a sprung resonant frequency component of a stroke velocity of the damper, and corrects a damping force target value of the damper on the basis of the extracted above-spring resonant frequency component.

8 Claims, 10 Drawing Sheets

DAMPER CONTROL DEVICE

TECHNICAL FIELD

The present invention relates to a damper control device.

BACKGROUND ART

JP 2008-238921A discloses a damper control device that controls a damping force of a damper interposed between a sprung member and an unsprung member of a vehicle. With a focus on a stroke velocity of the damper and upward/downward velocities of the sprung member, the damper control device realizes a skyhook damper based on a damping force switching rule according to Karnopp control. In a case where a direction of the stroke velocity of the damper is the same as a direction of the velocity of the sprung member, the damping force of the damper is increased. In a case where the direction of the stroke velocity of the damper is different from the direction of the velocity of the sprung member, the damping force of the damper is reduced.

In such a damper control device, there is a possibility that the stroke of the damper becomes so large that the ride quality decreases. Therefore, a target value obtained by multiplying the velocity of the unsprung member by a control gain is compared with a target value for skyhook control, a larger one of the target values is used as a target damping force, and the damper is caused to output the target damping force. The control gain is set to have a large value when the stroke of the damper is large or the stroke velocity of the damper is high. Also, the target value derived from the unsprung the unsprung member is set to have a roughly large value when the stroke velocity of the damper is high and a stroke amount of the damper is large. In this way, an excessive stroke of the damper is suppressed.

SUMMARY OF INVENTION

Here, if only the skyhook control is performed, while running on a wavy road surface that excites low-frequency vibration of the sprung member, the sprung member is controlled to be flat. This prevents the sprung member from tracking the waves in the road surface, thus giving rise to the possibility that a passenger of the vehicle feels a sense of discomfort.

On the other hand, the above-described damper control device performs control for suppressing the stroke of the damper in accordance with the condition of vibration of the unsprung member. As a result, the road surface tracking property is improved. However, if this control is performed on an uneven road surface, the ride quality is degraded. Therefore, control for suppressing the stroke is not performed on an uneven road surface. As a result, the road surface tracking property decreases, and hence there is a possibility that a passenger of the vehicle feels a sense of discomfort.

It is an object of the present invention to provide a damper control device that improves the road surface tracking property and prevents a passenger of a vehicle from feeling a sense of discomfort.

According to one aspect of the present invention, a damper control device controls vibration of an unsprung member by controlling a damping force of a damper interposed between a sprung member and an unsprung member of a vehicle on the basis of a damping property prepared in advance. The damper control device includes a correction unit configured to extract a sprung resonant frequency component of a stroke velocity of the damper, and correct a damping force target value of the damper on the basis of the extracted sprung resonant frequency component.

DESCRIPTION OF EMBODIMENTS

Described below is an embodiment of the present invention with reference to the accompanied drawings.

Figure 1:
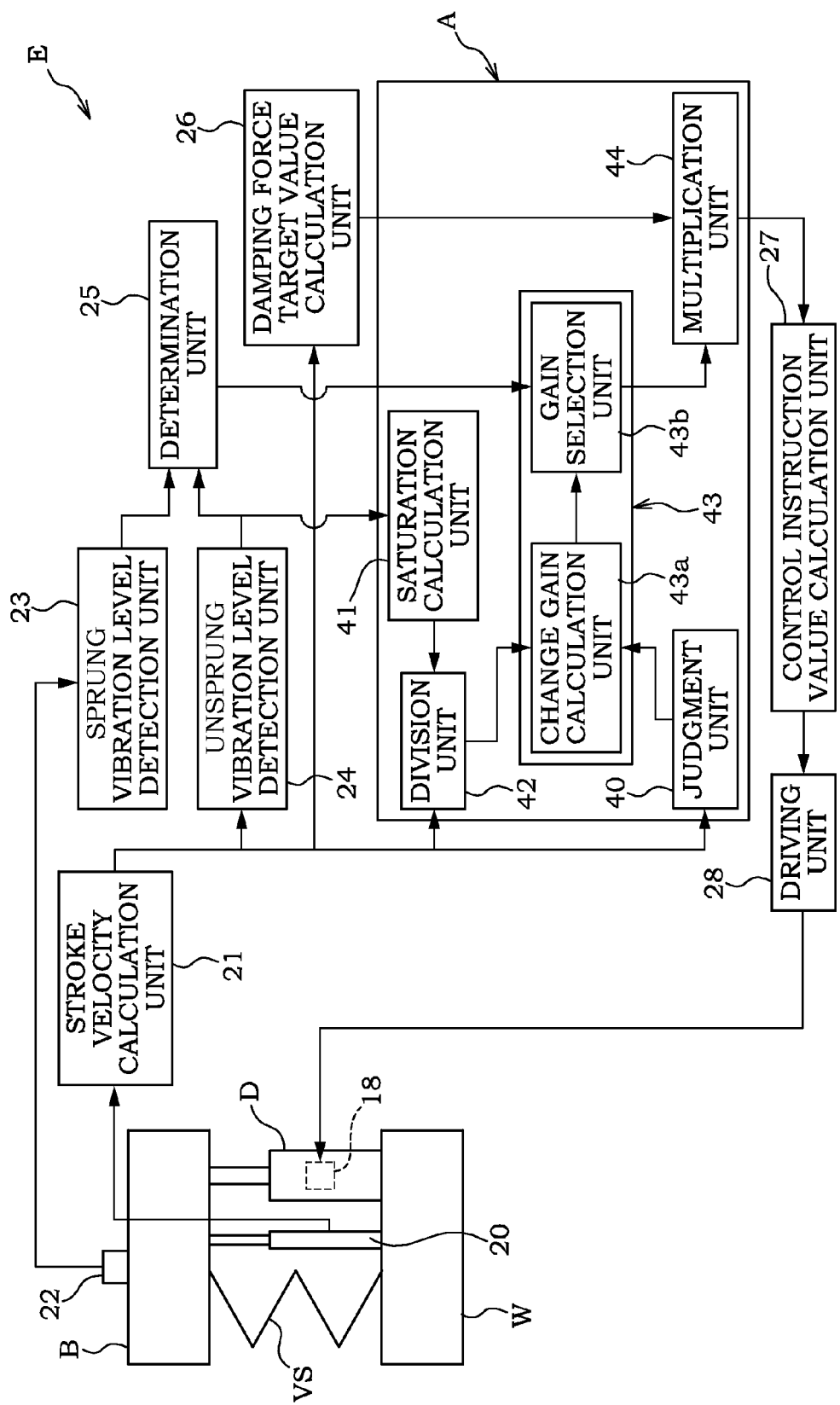
FIG. 1 shows a configuration of a damper control device according to an embodiment of the present invention.

As shown in FIG. 1, a damper control device E controls vibration of an unsprung member W by controlling a damping force of a damper D, which is interposed between an above-spring member B and the unsprung member W of a vehicle, on the basis of a damping property prepared in advance. The damper control device E includes a correction unit A that extracts a sprung resonant frequency component of a stroke velocity Vd of the damper D, and corrects a damping force target value F of the damper D on the basis of the sprung resonant frequency component of the stroke velocity Vd.

The damper D is interposed between the sprung member B and the unsprung member W of the vehicle, and is arranged in parallel with a suspension spring VS that elastically supports the sprung member B. The unsprung member W includes a vehicle wheel and a link that are swingably attached to the sprung member B representing a vehicle body.

Figure 2:
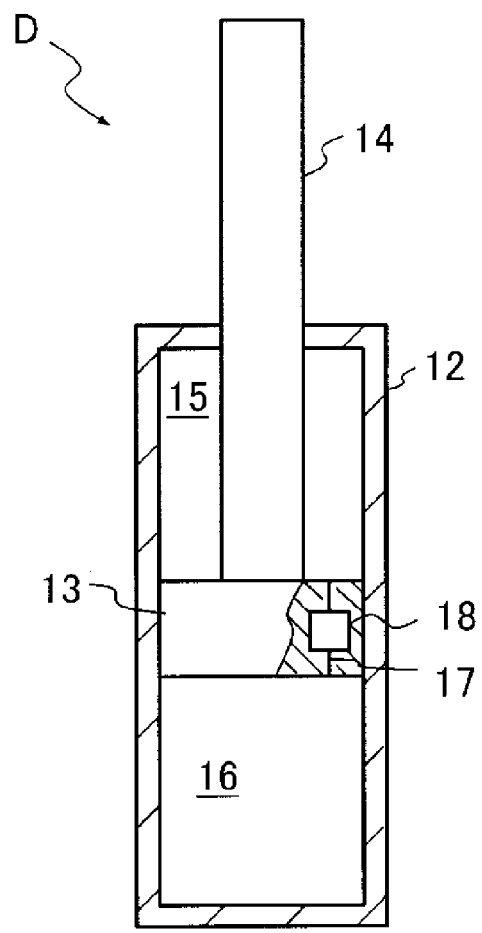
FIG. 2 shows a general cross section of a damper.

As shown in FIG. 2, the damper D is a fluid pressure damper including a cylinder 12, a piston 13, a piston rod 14, two pressure chambers 15, 16, a passage 17, and a damping force adjustment unit 18. The piston 13 is slidably inserted into the cylinder 12. The piston rod 14 is movably inserted into the cylinder 12 and joined to the piston 13. The two pressure chambers 15, 16 are defined inside the cylinder 12, are separated by the piston 13, and communicate with each other via the passage 17. The damping force adjustment unit 18 applies resistance to the flow of a fluid passing through the passage 17. When a fluid that fills the pressure chambers 15, 16 passes through the passage 17 in accordance with an extension/compression operation, the damper D exerts a damping force that suppresses the extension/compression operation by applying resistance to the fluid using the damping force adjustment unit 18. In this way, relative movements of the sprung member and the unsprung member are suppressed.

The fluid is a viscous magnetofluid and fills the pressure chambers 15, 16. The damping force adjustment unit 18 can cause a magnetic field to act on the passage 17. The damping force adjustment unit 18 can change a damping force of the damper D by adjusting a magnitude of the magnetic field using an amount of current supplied from the damper control device E so as to change the resistance applied to the flow of the viscous magnetofluid passing through the passage 17. The damper control device E controls the damping force of the damper D by increasing and reducing current provided to the damping force adjustment unit 18.

It should be noted that a viscous electrofluid may be used as the fluid in place of the viscous magnetofluid. In this case, it suffices for the damping force adjustment unit 18 to be an element that can cause an electric field to act on the passage 17. The damping force adjustment unit 18 can change a damping force generated by the damper D by adjusting a magnitude of the electric field using voltage provided by the damper control device E so as to change the resistance applied to the flow of the viscous electrofluid passing through the passage 17.

Other than the aforementioned viscous magnetofluid and viscous electrofluid, an operating oil, water, water solution, gas, and the like can be used as the fluid. In this case, the damping force adjustment unit 18 is constituted by a damping valve and an actuator with a high control response, such as a solenoid. The damping valve makes a flow passage area of the passage 17 of the damper D changeable. The actuator can regulate the flow passage area of the passage 17 by driving a valve body of the damping valve. The damping force adjustment unit 18 adjusts the flow passage area of the passage 17 by increasing and reducing an amount of current provided to the actuator. In this way, resistance applied to the flow of the fluid passing through the passage 17 is changed, and the damping force generated by the damper D can be adjusted.

In a case where the fluid is a liquid and the damper D is of a single-rod type, the damper D includes a gas chamber or a reservoir for compensating for a volume of the piston rod 14 that recedes from and enters the inside of the cylinder 12. In a case where the fluid is a gas, the damper D need not include the gas chamber and the reservoir. In a case where the damper D includes a reservoir and is of a uniflow type, that is, the fluid is discharged via a passage that leads from the inside of the cylinder 12 to the reservoir during extension and compression, the damping force adjustment unit 18 may be provided on the passage that leads from the cylinder 12 to the reservoir, and the damping force may be exerted by applying resistance to the flow of the fluid.

The damper D may be an electromagnetic damper that exerts a damping force suppressing relative movements of the sprung member and the unsprung member using an electromagnetic force. The electromagnetic damper is, for example, an element that includes a motor and a motion conversion mechanism that converts a rotary motion of the motor into a linear motion, a linear motor, and the like. In a case where the damper D is the electromagnetic damper, the damping force generated by the damper D can be adjusted by the damping force adjustment unit 18 functioning as a motor driving device that regulates current that flows through the motor or the linear motor.

As shown in FIG. 1, the damper control device E includes a stroke sensor 20, a stroke velocity calculation unit 21, an acceleration sensor 22, a sprung vibration level detection unit 23, an unsprung vibration level detection unit 24, a determination unit 25, a damping force target value calculation unit 26, the correction unit A, a control instruction value calculation unit 27, and a driving unit 28. The stroke sensor 20 detects a stroke displacement of the damper D. The stroke velocity calculation unit 21 obtains a stroke velocity Vd from the stroke displacement of the damper D detected by the stroke sensor 20. The acceleration sensor 22 detects acceleration $\alpha$ of the sprung member B in an up-down direction. The sprung vibration level detection unit 23 obtains a sprung vibration level rB of the sprung member B from the acceleration $\alpha$ of the sprung member B in the up-down direction that has been detected by the acceleration sensor 22. The unsprung vibration level detection unit 24 obtains an unsprung vibration level rW, which is a magnitude of vibration of the unsprung member W, from the stroke displacement of the damper D detected by the stroke sensor 20. The determination unit 25 determines, from the sprung vibration level rB and the unsprung vibration level rW, whether or not the correction unit A needs to correct the damping force target value F. The damping force target value calculation unit 26 obtains the damping force target value F from a damping property, which is prepared in advance, and the stroke velocity Vd of the damper D. If the determination unit 25 determines that the correction is necessary, the correction unit A extracts a sprung resonant frequency component of the stroke velocity Vd, obtains a correction gain G used in the correction of the damping force target value F from the extracted above-spring resonant frequency component of the stroke velocity and from extension/compression information of the damper D, and obtains a final damping force target value F* by multiplying the damping force target value F by the correction gain G. The control instruction value calculation unit 27 obtains a current value I provided to the damping force adjustment unit 18 on the basis of the damping force target value F* obtained by the correction unit A. The driving unit 28 supplies an amount of current compliant with the current value I obtained by the control instruction value calculation unit 27 to the damping force adjustment unit 18.

As shown in FIG. 1, the stroke velocity calculation unit 21 calculates the stroke velocity Vd of the damper D by differentiating the stroke displacement of the damper D detected by the stroke sensor 20.

The acceleration $\alpha$ of the sprung member B in the up-down direction detected by the acceleration sensor 22 is input to the sprung vibration level detection unit 23. The sprung vibration level detection unit 23 obtains the sprung vibration level rB representing a magnitude of vibration of the sprung member B from the acceleration $\alpha$. The stroke velocity Vd is input to the unsprung vibration level detection unit 24. The unsprung vibration level detection unit 24 obtains the unsprung vibration level rW representing a magnitude of vibration of the unsprung member W from the stroke velocity Vd.

The sprung vibration level detection unit 23 and the unsprung vibration level detection unit 24 will now be described.

First, a description is given of the principle of a method for detecting vibration levels in the sprung vibration level detection unit 23 and the unsprung vibration level detection unit 24.

Figure 3:
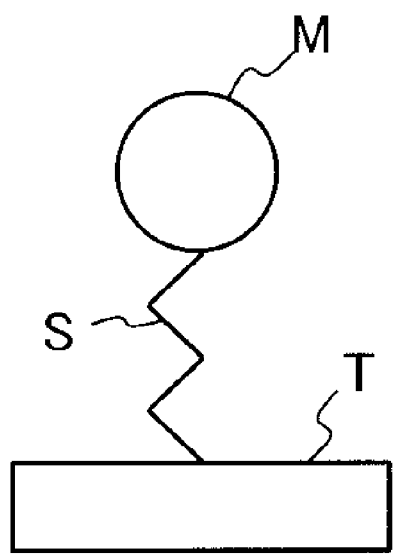
FIG. 3 is an explanatory diagram showing a system of an object whose vibration level is to be detected.

Assume a case in which a vibration level of a mass M is detected in a system where the mass M is borne by a spring S, as shown in FIG. 3. The mass M constitutes a spring-mass system in which the mass M is elastically supported by the spring S, which is vertically attached to a base T, from a lower side in the figure. A vibration level r of the mass M in the up-down direction in FIG. 3 is calculated on the basis of a first reference value a and a second reference value b, the first reference value a being the velocity of the mass M in the up-down direction, and the second reference value b being equivalent to a differential value or an integrated value of the first reference value a.

The first reference value a, which is the velocity of the mass M in the up-down direction, is calculated by, for example, integrating the acceleration of the mass M in the up-down direction detected by an acceleration sensor attached to the mass M.

In a case where the second reference value b is a displacement of the mass M in the up-down direction, the second reference value b is calculated by integrating the first reference value a. In a case where the second reference value b is equivalent to a differential value of the first reference value a, that is to say, in a case where the second reference value b is the acceleration of the mass M in the up-down direction, the second reference value b may be set to the acceleration in the up-down direction detected by the acceleration sensor, or may be calculated by differentiating the first reference value a using a differentiator.

Also, in order to enable detection of a vibration level in an arbitrary frequency range among vibration levels of the mass M that are desired to be detected, frequency components that are desired to be detected from the first reference value a and the second reference value b are extracted. Specifically, frequency components of the first reference value a and the second reference value b that are desired to be detected are calculated by filtering the first reference value a and the second reference value b using a band-pass filter and the like. Basically, vibration of the mass M with a high spectral density can be extracted by setting a natural frequency of the spring-mass system of the mass M and the spring S to a frequency extracted using a band-pass filter. The band-pass filter is useful as it enables extraction of vibration in a frequency range that is desired to be evaluated, as well as removal of noise superimposed on vibration of the mass M and the like. However, the band-pass filter may be omitted, for example, in a case where the mass M vibrates in a single cycle.

Vibration of the mass M with an arbitrary frequency can be expressed by a sine wave. An arbitrary frequency component of the first reference value a, which is the velocity of the mass M, can be expressed by a sine wave. For example, in a case where an arbitrary frequency component of the first reference value a is expressed as sin $\omega$t ($\omega$ being an angular frequency, t being time), integration of the same results in $-(1/\omega)\cos \omega t$. Comparing the amplitude of the first reference value a with the amplitude of the integrated value, the amplitude of the integrated value is $1/\omega$ times the first reference value a.

Therefore, in a case where the second reference value b is equivalent to the integrated value of the first reference value a, it is possible to adjust the first reference value a and the second reference value b to have the same amplitude by multiplying a value equivalent to the integrated value of the first reference value a by $\omega$, i.e., the angular frequency $\omega$ that matches the frequency extracted using a filter. On the other hand, in a case where the second reference value b is equivalent to the differential value of the first reference value a, it is possible to adjust the first reference value a and the second reference value b to have the same amplitude by multiplying a value equivalent to the differential value of the first reference value a by $1/\omega$. As set forth above, in order to cause the first reference value a and the second reference value b to have the same amplitude, the second reference value b is adjusted as follows in the course of obtainment of a vibration level. In a case where the second reference value b is equivalent to the integrated value of the first reference value a, a value equivalent to the integrated value is multiplied by $\omega$, i.e., the angular frequency $\omega$ of vibration targeted for detection. In a case where the second reference value b is equivalent to the differential value of the first reference value a, a value equivalent to the differential value is multiplied by $1/\omega$.

Figure 4:
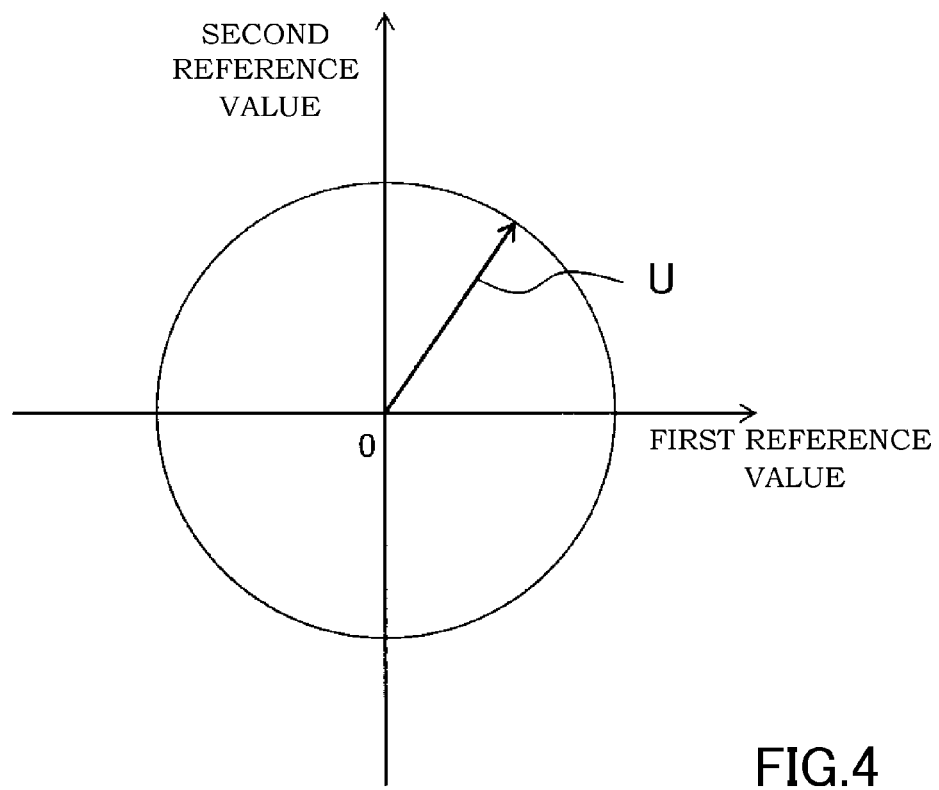
FIG. 4 is an explanatory diagram showing a synthetic vector of first and second reference values.

Subsequently, the first reference value a and the second reference value b processed in the above-described manner are plotted as orthogonal coordinates as shown in FIG. 4, and the length of a synthetic vector U of these first reference value a and second reference value b is calculated as a vibration level L. The length of the synthetic vector U is calculated as $(a^2+b^2)^{1/2}$. However, $(a^2+b^2)$ with omission of root calculation, that is to say, a value of a square of the length of the synthetic vector U may be regarded as a value that enables determination of the length of the synthetic vector U and be used as the vibration level r. In this way, high-load root calculation can be avoided, and calculation time can be shortened. Also, a value obtained by raising the length of the synthetic vector U to the $z^{th}$ power (z being an arbitrary value), as well as a value obtained by multiplying this length by an arbitrary coefficient, makes the length of the synthetic vector U recognizable and therefore may be used as a vibration level, although it does not directly match the length of the synthetic vector U. That is to say, it is sufficient to use a value that makes the length of the synthetic vector U recognizable as a vibration level r.

Here, if vibration is applied to the mass M by moving the base T upward and downward or by releasing the mass M after displacing the mass M, the spring S extends and compresses, and the elastic energy of the spring S and the kinetic energy of the mass M are converted alternately. Therefore, in a case where there is no disturbance, the mass M has a zero velocity when the displacement thereof from a neutral position is maximized, and the mass M has a maximum velocity at the neutral position. It should be noted that the mass M is at the neutral position when it is in a stationary state while being elastically supported by the spring S.

Through the correction of the above-described procedure, the first reference value a and the second reference value b have the same amplitude, and are out of phase from each other by 90 degrees. Therefore, if vibration of the mass M does not damp down and the same vibration is repeated, an ideal trajectory of the first reference value a and the second reference value b draws a circle as shown in FIG. 4. The vibration level r is equal to the radius of this circle. It should be noted that, in reality, the first reference value a and the second reference value b may not be able to have completely matching amplitudes due to the extraction accuracy of a filter, disturbance acting on the mass M, noise included in the first reference value a and the second reference value b, and the like. However, the value of the vibration level r is substantially equal to the radius of the above-described circle.

As set forth above, regarding the vibration level r, the second reference value b representing the displacement has a maximum absolute value even if the first reference value a representing the velocity is zero. Conversely, the first reference value a has a maximum absolute value even if the second reference value b is zero. In this way, the vibration level r has a constant value in a case where the condition of vibration of the mass M does not change. That is to say, the vibration level r is an index value indicating the extent of the amplitude at which the mass M is vibrating, and represents a magnitude of vibration. The vibration level r can be obtained on the basis of the displacement and velocity of the mass M without obtaining a wave height through sampling of one of the displacement, velocity, and acceleration of the mass M corresponding to one cycle. Therefore, the vibration level r can be obtained timely. The above-described detection of a vibration level enables timely and real-time detection of a magnitude of vibration of the mass M.

It should be noted that the vibration level r may be obtained under the assumption that the first reference value a and the second reference value b are the velocity and acceleration of the mass M, the acceleration and a change ratio of the acceleration, and the displacement and a value equivalent to an integrated value of the displacement. In this case also, the first reference value a and the second reference value b are out of phase with each other by 90 degrees, and the second reference value b is adjusted using the angular frequency $\omega$ of vibration that is desired to be detected; accordingly, a trajectory of the first reference value a and the second reference value b plotted as orthogonal coordinates draws a circle, and the vibration level r serves as an index representing a magnitude of vibration. That is to say, the vibration level r can be obtained by setting the first reference value a to one of the displacement, velocity, and acceleration of the mass M corresponding to a direction of vibration that is desired to be detected, and setting the second reference value b to a value equivalent to an integrated value or a differential value of the first reference value a.

The first reference value a may be obtained by differentiating or integrating the output of a sensor, instead of obtaining the same directly from the sensor. The second reference value b may be obtained directly from another sensor that is separately provided, instead of obtaining the same as a value equivalent to the differential value or the integrated value of the first reference value a.

Furthermore, in a case where the second reference value b is equivalent to the integrated value of the first reference value a, it is permissible to: use a value equivalent to the differential value of the first reference value a as a third reference value c; obtain, as a first vibration level r1, a value equivalent to a vibration level from the first reference value a and the second reference value b through the above-described procedure; and obtain, as a second vibration level r2, a value equivalent to a vibration level from the first reference value a and the third reference value c through the above-described procedure by using the third reference value c in place of the second reference value b. In this case, an average value of the first vibration level r1 and the second vibration level r2, which is calculated by dividing a sum of the first vibration level r1 and the second vibration level r2 by two, is the vibration level r. In a case where the second reference value b is equivalent to the differential value of the first reference value a, it is sufficient to use a value equivalent to the integrated value of the first reference value a as the third reference value c.

Figure 5:
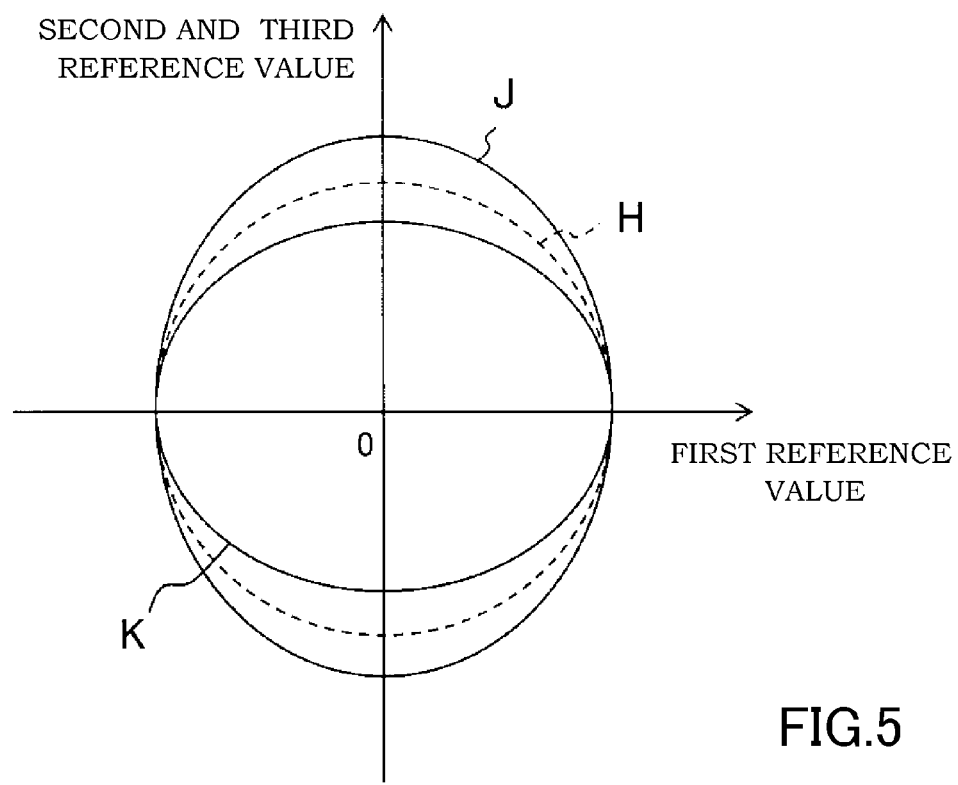
FIG. 5 is an explanatory diagram showing a trajectory of first and second reference values, and a trajectory of first and third reference values.

In this case, assume orthogonal coordinates realized by taking the first reference value a along a horizontal axis, and the second reference value b and the third reference value c along a vertical axis, as shown in FIG. 5. The first reference value a, the second reference value b, and the third reference value c are filtered using a band-pass filter in order to obtain a vibration level in a detected frequency range among vibration levels of the mass M.

However, in a case where a vibration frequency of the mass M is offset from a frequency extracted using the band-pass filter, the first vibration level r1 takes a value equal to or larger than the maximum value of the first reference value a, and a trajectory J of the first reference value a and the second reference value b forms an elliptic shape whose major axis is longer than a circle H whose radius is the maximum value of the first reference value a as indicated by a dash line in FIG. 5. The second vibration level r2 takes a value equal to or smaller than the maximum value of the first reference value a, and a trajectory K of the first reference value a and the third reference value c forms an elliptic shape whose minor axis is shorter than the circle H.

That is to say, in a case where the vibration frequency of the mass M does not match the vibration frequency that is desired to be detected, the angular frequency $\omega$ used in the correction of the above-described procedure is offset from an actual angular frequency $\omega'$. As a result, when the second reference value b equivalent to the integrated value of the first reference value a has been adjusted, the maximum value of the second reference value b is $\omega/\omega'$ times the maximum value of the first reference value a, and the maximum value of the third reference value c equivalent to the differential value of the first reference value a is $\omega'/\omega$ times the maximum value of the first reference value a.

As set forth above, in a case where the first vibration level r1 takes a value larger than the first reference value a, the second vibration level r2 takes a value smaller than the first reference value a in a corresponding manner. Therefore, by obtaining their average as the vibration level r, fluctuations in the vibration level r are alleviated, and the obtained vibration level r is stable even if the vibration frequency of the mass M does not match the vibration frequency that is desired to be detected. This makes it possible to detect the vibration level r with high accuracy. It is known that, in a case where the vibration level r is in waves, noise of a frequency component that is double the vibration frequency of the mass M is superimposed on the vibration level r, even if the fluctuations in the vibration level r are thus alleviated. In this case, it is sufficient to filter the vibration level r by providing a filter that removes the superimposed noise.

In the above-described example, the vibration level r is obtained using the second reference value b and the third reference value c that are equivalent to the integrated value and the differential value of the first reference value a. Alternatively, for example, it is permissible to obtain not only the vibration level r by using the displacement and the velocity as the first reference value a and the second reference value b, respectively, but also another vibration level r separately by using the acceleration and a change ratio of the acceleration as the first reference value a and the second reference value b, respectively. In this case, an average value of the vibration level r obtained from the displacement and the velocity and the vibration level r obtained from the acceleration and the change ratio of the acceleration is obtained as a final vibration level. That is to say, it is also possible to obtain a final vibration level on the basis of a plurality of vibration levels obtained from different first and second reference values.

The following is a specific description of a method for detecting the sprung vibration level rB of the sprung member B of the vehicle provided with the sprung vibration level detection unit 23.

Figure 6:
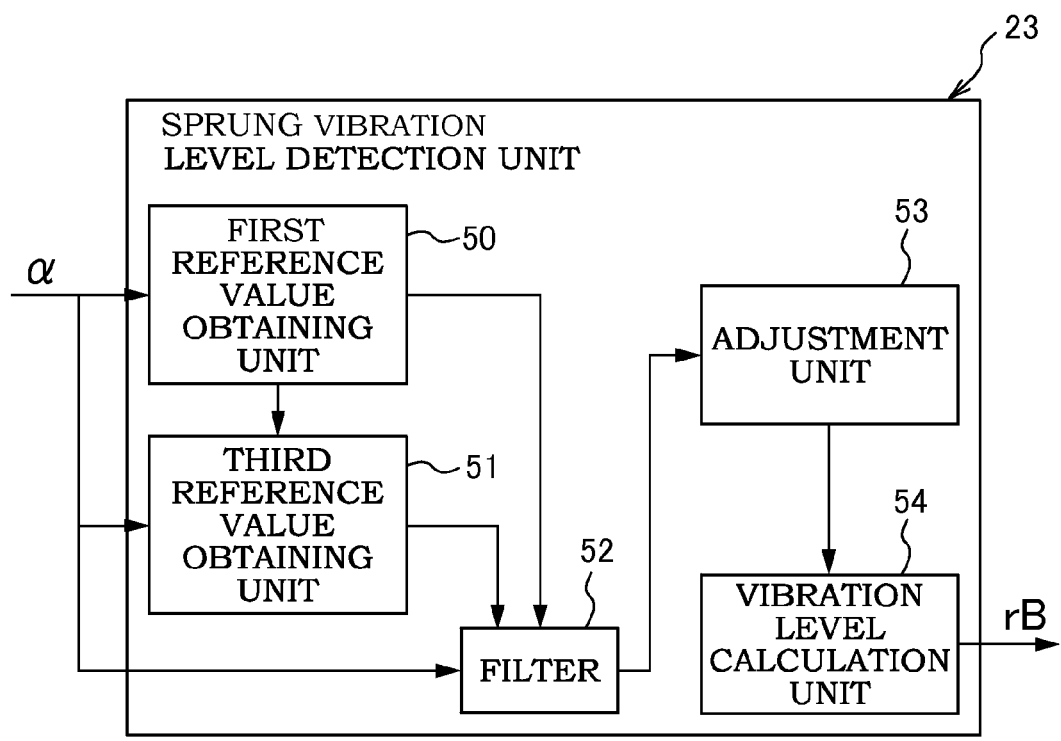
FIG. 6 shows a configuration of a sprung vibration level detection unit.

As shown in FIG. 6, the sprung vibration level detection unit 23 includes a first reference value obtaining unit 50, a third reference value obtaining unit 51, a filter 52, an adjustment unit 53, and a vibration level calculation unit 54. Using the acceleration $\alpha$ of the sprung member B in the up-down direction obtained from the acceleration sensor 22 as a second reference value, the first reference value obtaining unit 50 obtains a first reference value equivalent to an integrated value of the second reference value. The third reference value obtaining unit 51 obtains a third reference value equivalent to an integrated value of the first reference value. The filter 52 extracts a resonant frequency component of the sprung member from the first, second, and third reference values. The vibration level calculation unit 54 obtains the sprung vibration level rB. Because the acceleration α of the sprung member B obtained by the acceleration sensor 22 is used as the second reference value as-is, the acceleration α is input to the filter 52 as-is.

The first reference value obtaining unit 50 obtains a sprung velocity VB, which is the velocity of the sprung member B in the up-down direction, by integrating the second reference value, i.e., the acceleration α. The third reference value obtaining unit 51 obtains a sprung displacement XB, which is a displacement of the sprung member B in the up-down direction, by integrating the sprung velocity VB, i.e., the first reference value, and uses the sprung displacement XB as the third reference value.

The filter 52 extracts only a frequency component of the sprung member B in a resonant frequency range included in the sprung velocity VB, acceleration α, and above-spring displacement XB by filtering the sprung velocity VB, acceleration α, and above-spring displacement XB, which are respectively the first, second, and third reference values.

It is sufficient to obtain the displacement, velocity, and acceleration of the sprung member B. Therefore, in a case where the first and third reference values are obtained from the second reference value, processing of the filter 52 may be applied only to the acceleration α. That is to say, filter processing may be applied directly to the output of the acceleration sensor 22.

The adjustment unit 53 adjusts the first, second, and third reference values thus obtained using an angular frequency ω that matches resonant frequencies of the sprung member B.

The vibration level calculation unit 54 obtains a first vibration level rB1 from the first and second reference values, and a second vibration level rB2 from the first and third reference values. The vibration level calculation unit 54 obtains an average value of the first vibration level rB1 and the second vibration level rB2 as the sprung vibration level rB of the sprung member B. It should be noted that the sprung vibration level rB of the sprung member B may be obtained from the first and second reference values without providing the third reference value obtaining unit 51. However, by obtaining the sprung vibration level rB with the third reference value obtaining unit 51, the sprung vibration level rB can be detected with higher accuracy. The sprung vibration level rB is input to the determination unit 25.

Figure 7:
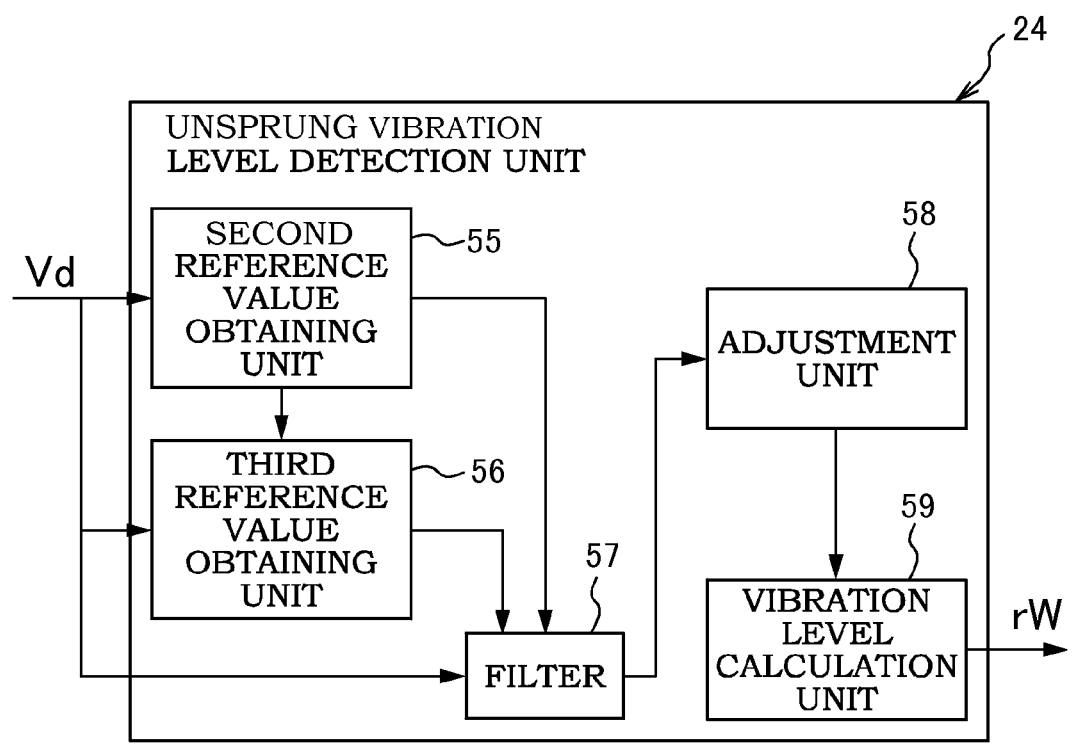
FIG. 7 shows a configuration of an unsprung vibration level detection unit.

As shown in FIG. 7, the unsprung vibration level detection unit 24 includes a second reference value obtaining unit 55, a third reference value obtaining unit 56, a filter 57, an adjustment unit 58, and a vibration level calculation unit 59. Using the stroke velocity Vd of the damper D obtained from the stroke velocity calculation unit 21 as a first reference value, the second reference value obtaining unit 55 obtains a second reference value equivalent to a differential value of the first reference value. The third reference value obtaining unit 56 obtains a third reference value equivalent to an integrated value of the first reference value. The filter 57 extracts a resonant frequency component of the unsprung member from the first, second, and third reference values. The vibration level calculation unit 59 obtains the unsprung vibration level rW. Because the stroke velocity Vd of the damper D obtained from the stroke velocity calculation unit 21 is used as the first reference value as-is, the stroke velocity Vd is input to the filter 57 as-is.

It should be noted that the unsprung vibration level detection unit 24 does not include a first reference value obtaining unit because the damper control device E is provided with the stroke velocity calculation unit 21 and a stroke velocity Vd obtained by the stroke velocity calculation unit 21 is used as a first reference value. However, in a case where the acceleration, velocity, and displacement of the unsprung member W in the up-down direction are directly detected as a first reference value using a sensor attached to the unsprung member W, the unsprung vibration level detection unit 24 may include a first reference value obtaining unit that obtains the acceleration, velocity, and displacement of the unsprung member W in the up-down direction as a first reference value.

The second reference value obtaining unit 55 obtains stroke acceleration ad of the damper D by differentiating the first reference value representing the stroke velocity Vd of the damper D. The third reference value obtaining unit 56 obtains a damper displacement Xd representing a stroke displacement of the damper D by integrating the first reference value representing the stroke velocity Vd, and uses the damper displacement Xd as the third reference value. It should be noted that, as the damper displacement Xd is detected by the stroke sensor 20, the detected damper displacement Xd may be used as the third reference value as-is.

The filter 57 extracts only a frequency component of the unsprung member W in a resonant frequency range included in the stroke velocity Vd, stroke acceleration ad, and damper displacement Xd by filtering the stroke velocity Vd, stroke acceleration ad, and damper displacement Xd, which are respectively the first, second, and third reference values.

It is sufficient to obtain the displacement, velocity, and acceleration of the unsprung member W. Therefore, in a case where the second and third reference values are obtained by differentiating and integrating the first reference value, processing of the filter 57 may be applied only to the damper displacement Xd prior to obtainment of the first reference value. That is to say, filter processing may be applied directly to the output of the stroke sensor 20, and may be applied only to the first reference value priorh to obtainment of the second and third reference values.

The adjustment unit 58 adjusts the first, second, and third reference values thus obtained using an angular frequency ω that matches resonant frequencies of the unsprung member W.

The vibration level calculation unit 59 obtains a first vibration level rW1 from the first and second reference values, and a second vibration level rW2 from the first and third reference values. The vibration level calculation unit 59 obtains an average value of the first vibration level rW1 and the second vibration level rW2 as an unsprung vibration level rW of the unsprung member W. It should be noted that the unsprung vibration level rW may be obtained from the first and second reference values without providing the third reference value obtaining unit 56. However, by obtaining the unsprung vibration level rW with the third reference value obtaining unit 56, the unsprung vibration level rW can be detected with higher accuracy. As shown in FIG. 1, the unsprung vibration level rW is input to the determination unit 25 and the correction unit A. The unsprung vibration level rW is used by the determination unit 25 as information for determining whether or not the correction unit A needs to correct the damping force target value F, and is used by the correction unit A as information for obtaining the damping force target value F* through correction of the damping force target value F.

The determination unit 25 determines that the correction unit A needs to correct the damping force target value F if the sprung vibration level rB is equal to or higher than a predetermined above-spring vibration level threshold and the unsprung vibration level rW is equal to or higher than a predetermined below-spring vibration level threshold. The determination unit 25 determines that the correction unit A does not need to correct the damping force target value F otherwise. The sprung vibration level rB is equal to or higher than the predetermined above-spring vibration level threshold and the unsprung vibration level rW is equal to or higher than the predetermined below-spring vibration level threshold in, for example, a case where a road surface on which the vehicle is running is an uneven bad wavy road with many concavities and convexities, and a case where the vehicle passes over sporadic protrusions. In these cases, both the unsprung member W and the sprung member B undergo large vibration, and it is necessary to control vibration of the unsprung member W and vibration of the sprung member B. Accordingly, vibration of the unsprung member W and vibration of the sprung member B are controlled by correcting the damping force target value F in the correction unit A.

Figure 8:
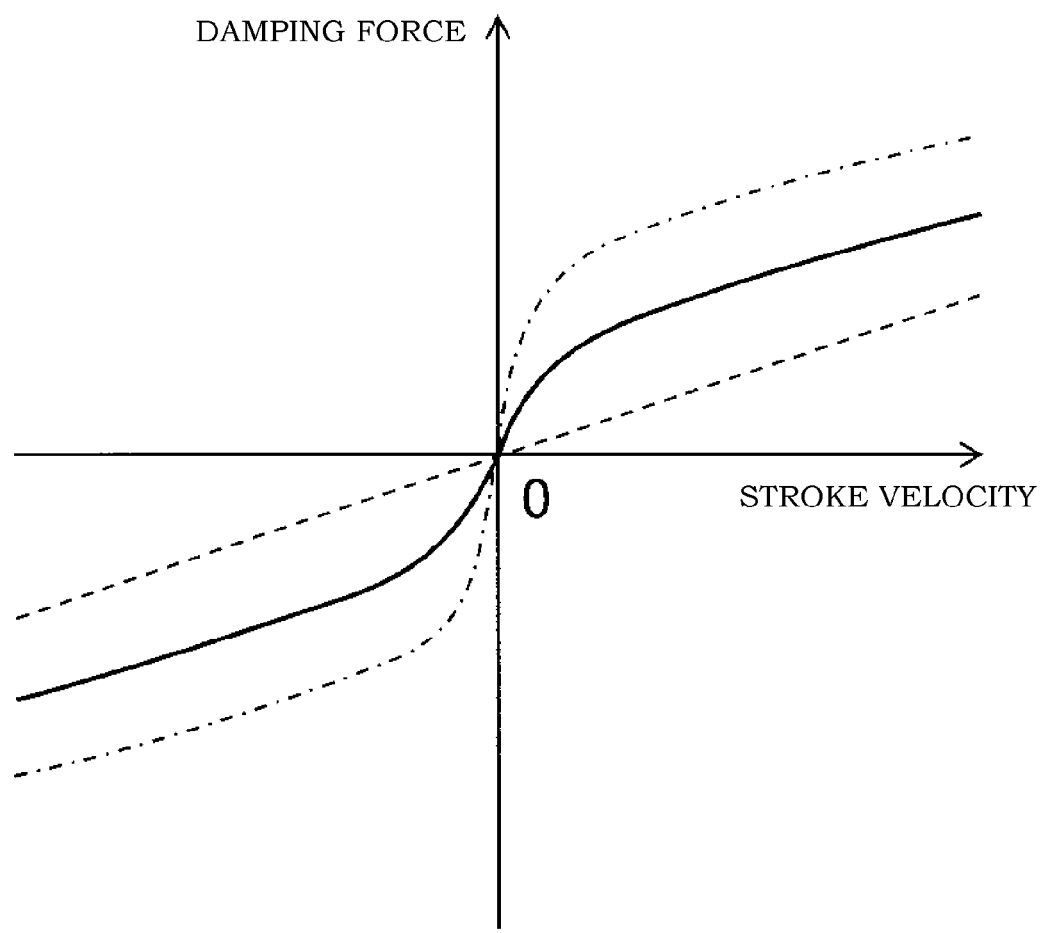
FIG. 8 shows a damping property of the damper.

The damping force target value calculation unit 26 obtains a target damping force from the damping property prepared in advance, and from the stroke velocity Vd obtained by the stroke velocity calculation unit 21. With reference to a damping property map shown in FIG. 8, the damping force target value calculation unit 26 obtains a damping force corresponding to a current stroke velocity Vd as a damping force target value F. The damping property shown in FIG. 8 indicates a damping force suitable for suppression of vibration of the unsprung member W in relation to a stroke velocity Vd. It should be noted that, in FIG. 8, a dash line indicates a lower output limit of a damping force of the damper D, whereas a dash-and-dot line indicates an upper output limit of a damping force of the damper D. The damper D can change a damping force in a range from the lower output limit to the upper output limit.

A description is now given of the correction unit A that obtains the damping force target value F* by correcting the damping force target value F.

The correction unit A includes a judgment unit 40, a saturation calculation unit 41, a division unit 42, a gain calculation unit 43, and a multiplication unit 44. On the basis of a sprung resonant frequency component of the stroke velocity Vd of the damper D and on the basis of vibration information of the damper D, the judgment unit 40 judges whether or not the damper D can exert a damping force that suppresses the sprung resonant frequency component of the stroke velocity Vd. The saturation calculation unit 41 causes a value of the unsprung vibration level rW to be saturated if the unsprung vibration level rW exceeds an upper limit value or goes below a lower limit value. Upon receiving the stroke velocity Vd and the unsprung vibration level rW as input, the division unit 42 divides the stroke velocity Vd by the vibration level r. On the basis of the result from the division unit 42 and on the basis of the result of judgment by the judgment unit 40, the gain calculation unit 43 obtains a correction gain G by which the damping force target value F is multiplied. The multiplication unit 44 obtains the damping force target value F* by multiplying the damping force target value F by the correction gain G. The damper control device E supplies current to the damping force adjustment unit 18 in accordance with the damping force target value F* obtained as a result of correction by the correction unit A, and causes the damper D to output a damping force compliant with the target damping force.

Upon receiving the stroke velocity Vd as input from the stroke velocity calculation unit 21, the judgment unit 40 obtains the sprung resonant frequency component of the stroke velocity Vd by executing filter processing for extracting the sprung resonant frequency component of the stroke velocity Vd. For example, the judgment unit 40 is set to execute the filter processing using approximately a resonant frequency of vibration of the sprung member B in the up-down direction as a cutoff frequency. On the basis of the sprung resonant frequency component of the stroke velocity Vd of the damper D and on the basis of vibration information of the damper D, the judgment unit 40 judges whether or not the damper D can exert a damping force that suppresses the sprung resonant frequency component of the stroke velocity Vd.

Furthermore, as it is sufficient for the vibration information of the damper D to be information that indicates a direction of a current damping force, it is sufficient for the vibration information of the damper D to be information such as the stroke velocity Vd and displacement of the damper D, and pressure in the pressure chambers 15, 16. Such information may be obtained directly from a sensor that senses a condition of vibration of the damper D, and may be obtained from a control device that is higher in level than the damper control device E if such a control device exists. In this case, as the damper control device E obtains the stroke velocity Vd, it is not necessary to separately provide a sensor for obtaining the vibration information of the damper D as long as the stroke velocity Vd obtained by the stroke velocity calculation unit 21 is input to the judgment unit 40, or the displacement of the damper D obtained by the stroke sensor 20 is input to the judgment unit 40, as the vibration information of the damper D as shown in FIG. 1.

The judgment unit 40 judges whether or not the damper D can exert a damping force that suppresses the sprung resonant frequency component of the stroke velocity Vd of the damper D. Specifically, the judgment unit 40 judges whether or not a direction of the sprung resonant frequency component of the stroke velocity Vd of the damper D matches a direction of extension/compression of the damper D. For example, in a case where the sprung resonant frequency component of the stroke velocity Vd of the damper D and the stroke velocity Vd are used, provided that an upward velocity among upward/downward velocities of the sprung resonant frequency component is positive and a stroke velocity Vd along the extension of the damper D is positive, it is judged that the damper D can exert a damping force that suppresses the sprung resonant frequency component on the condition that the sign of an upward/downward velocity of the sprung resonant frequency component matches the sign of the stroke velocity Vd, or on the condition that a product of an upward/downward velocity of the sprung resonant frequency component and the stroke velocity Vd is a positive value.

It should be noted that, in a case where an upward velocity among upward/downward velocities of the sprung resonant frequency component is positive and a stroke velocity Vd along the extension of the damper D is negative, or in a case where an upward velocity among upward/downward velocities of the sprung resonant frequency component is negative and a stroke velocity Vd along the extension of the damper D is positive, it is sufficient to judge that the damper D can exert a damping force that suppresses vibration of the sprung member B on the condition that the sign of an upward/downward velocity of the sprung resonant frequency component does not match the sign of the stroke velocity Vd, or on the condition that a product of an upward/downward velocity of the sprung resonant frequency component and the stroke velocity Vd is a negative value.

The saturation calculation unit 41 executes processing for restricting the unsprung vibration level rW to the lower limit value if the value thereof falls below the lower limit value, and restricting the unsprung vibration level rW to the upper limit value if the value thereof exceeds the upper limit value. For example, provided that the lower limit value and the upper limit value of the unsprung vibration level rW are 0.3 and 0.6, respectively, the value of the unsprung vibration level rW is set to 0.3 if it is smaller than 0.3, and the value of the unsprung vibration level rW is set to 0.6 if it is larger than 0.6. The value of the unsprung vibration level rW is output as-is if it is equal to or larger than 0.3, and is equal to or smaller than 0.6.

Upon receiving, as input, the stroke velocity Vd and the unsprung vibration level rW that has been output by the saturation calculation unit 41, the division unit 42 divides the stroke velocity Vd by the unsprung vibration level rW. A resultant quotient is input to the gain calculation unit 43 together with the result of judgment by the judgment unit 40. For example, in a case where the stroke velocity Vd is equal to or higher than 0.6 m/s, the unsprung vibration level rW is restricted to 0.6, and therefore the division unit 42 outputs a value equal to or larger than one. In a case where the unsprung vibration level rW is 0.6 and the stroke velocity Vd is 0.3, the division unit 42 outputs 0.5. In a case where the stroke velocity Vd is zero, the division unit 42 outputs zero. It should be noted that, as the sign of the stroke velocity Vd is inverted depending on a direction of the extension/compression of the damper D and the unsprung vibration level rW always takes a positive value, the sign of the quotient from the division unit 42 is inverted between the extension and the compression of the damper D. By thus providing the division unit 42, the stroke velocity Vd is normalized in map calculation by the gain calculation unit 43.

The gain calculation unit 43 includes a change gain calculation unit 43a and a gain selection unit 43b. The change gain calculation unit 43a obtains a correction gain G. The gain selection unit 43b selects the correction gain G obtained by the change gain calculation unit 43a if the determination unit 25 determines that the damping force target value F obtained by the damping force target value calculation unit 26 needs to be corrected, and sets the gain to one if the determination unit 25 determines that the damping force target value F obtained by the damping force target value calculation unit 26 need not be corrected. The gain selection unit 43b then outputs the selected or set gain.

The change gain calculation unit 43a has a gain map M1 and a gain map M2. The gain map M1 should be used in a case where the damper D can exert a damping force that suppresses the sprung resonant frequency component of the stroke velocity Vd of the damper D, whereas the gain map M2 should be used in a case where the damper D cannot exert a damping force that suppresses the sprung resonant frequency component of the stroke velocity Vd of the damper D. The gain map M1 is used in a case where a direction of the sprung resonant frequency component of the stroke velocity Vd of the damper D matches a direction of extension/compression of the damper D, whereas the gain map M2 is used in a case where a direction of the sprung resonant frequency component of the stroke velocity Vd of the damper D is different from a direction of extension/compression of the damper D. The change gain calculation unit 43a selects one of the two gain maps M1, M2 on the basis of the result of judgment by the judgment unit 40, obtains an addition gain from the stroke velocity Vd/rW, and obtains a correction gain G, by which the damping force target value F should be multiplied ultimately, by adding one to the addition gain. Here, the stroke velocity Vd/rW has been normalized by the division unit 42. That is to say, the more the value of the gain diverges from one, the larger the extent at which the damping force target value F is corrected.

Figure 9:
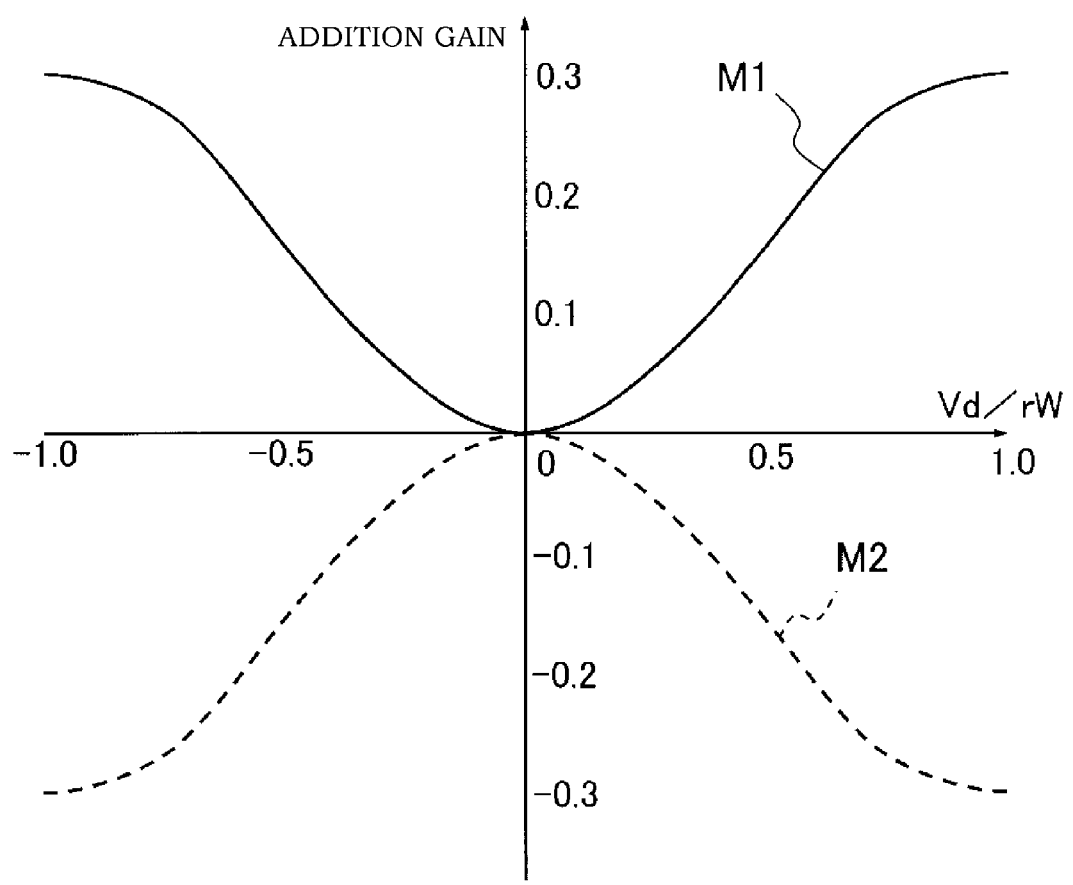
FIG. 9 shows gain maps.

The gain maps M1, M2 are set on a graph that takes the addition gain along a vertical axis and the normalized stroke velocity Vd/rW along a horizontal axis. As indicated by a solid line in FIG. 9, the gain map M1 is such that the addition gain takes a value from 0 to 0.3 with respect to the normalized stroke velocity Vd/rW that takes a value from −1 to 1 along the horizontal axis. As indicated by a dash line in FIG. 9, the gain map M2 is such that the addition gain takes a value from −0.3 to 0 with respect to the normalized stroke velocity Vd/rW. It should be noted that the addition gain takes a terminal value of the gain maps M1, M2, i.e., −0.3 or 0.3, in a case where the quotient from the division unit 42 is equal to or larger than 1, or is equal to or smaller than −1.

The change gain calculation unit 43a outputs a result of adding one to the value of the addition gain, which has been obtained through map calculation using the gain maps M1, M2, as a correction gain G. It should be noted that the gain may be obtained directly from the normalized stroke velocity Vd/rW by taking the gain along the vertical axis of the gain maps M1, M2. Even if an absolute value of the stroke velocity Vd is equal to or larger than the unsprung vibration level rW, the addition gain is restricted to the lower limit value of −0.3 or the upper limit value of 0.3, and therefore the value of the correction gain G is saturated. Also, the correction gain G changes in accordance with the stroke velocity Vd of the damper D. The correction gain G increases as the stroke velocity Vd increases.

The gain selection unit 43b selects the correction gain G obtained by the change gain calculation unit 43a if the determination unit 25 determines that the damper D can exert a damping force that suppresses the sprung resonant frequency component of the stroke velocity Vd of the damper D, and sets the correction gain G to one if the determination unit 25 determines that the damper D cannot exert a damping force that suppresses the sprung resonant frequency component of the stroke velocity Vd of the damper D. The gain selection unit 43b then outputs the selected or set correction gain G. If the damper D can exert a damping force that suppresses the sprung resonant frequency component of the stroke velocity Vd of the damper D, the damping force target value F* is obtained by the multiplication unit 44 correcting the damping force target value F, i.e., multiplying the damping force target value F by the correction gain G. If the damper D cannot exert a damping force that suppresses the sprung resonant frequency component of the stroke velocity Vd of the damper D, the correction gain G is one, and therefore the damping force target value F is not corrected (does not change) even if the multiplication unit 44 multiplies the damping force target value F by the correction gain G.

Figure 12:
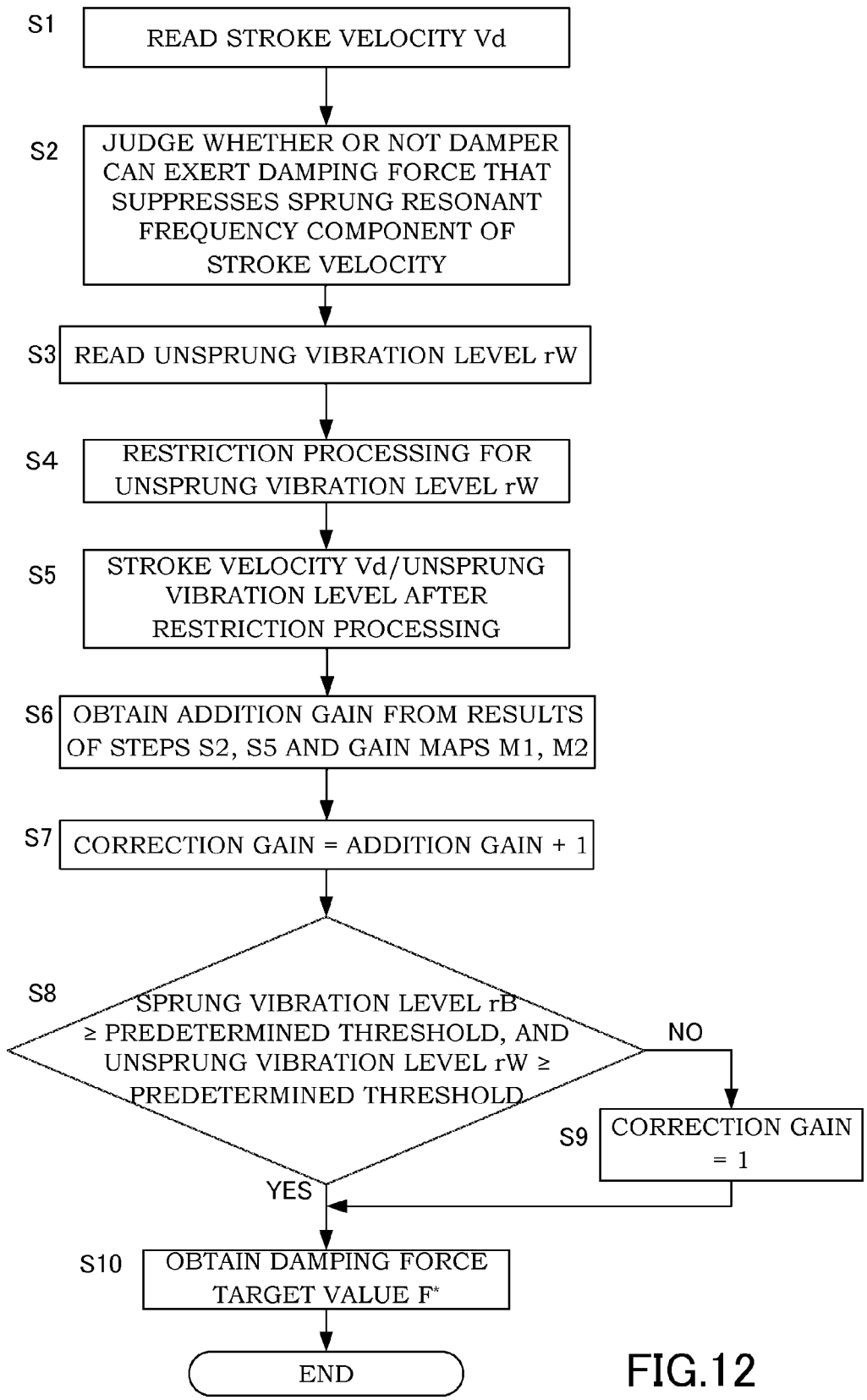
FIG. 12 is a flowchart showing the substance of processing executed by the correction unit A.

FIG. 12 is a flowchart showing the substance of processing executed by the correction unit A. In step S1, the correction unit A reads a stroke velocity Vd. In step S2, the correction unit A judges whether or not the damper D can exert a damping force that suppresses the sprung resonant frequency component of the stroke velocity Vd. In step S3, the correction unit A reads an unsprung vibration level rW. In step S4, the correction unit A executes processing for restricting the unsprung vibration level rW to a lower limit value if the value thereof falls below the lower limit value, and to an upper limit value if the value thereof exceeds the upper limit value. In step S5, the correction unit A divides the stroke velocity Vd by the unsprung vibration level processed in step S4. In step S6, the correction unit A obtains an addition gain from the result of judgment in step S2, the quotient from step S5, and gain maps M1, M2. In step S7, the correction unit A obtains a correction gain by adding one to the addition gain. In step S8, the correction unit A determines whether or not the following condition is satisfied: a sprung vibration level rB is equal to or higher than a predetermined threshold, and the unsprung vibration level rW is equal to or higher than a predetermined threshold. Processing proceeds to step S10 if this condition is satisfied, and to step S9 if this condition is not satisfied. In step S9, the correction unit A sets the correction gain to one. In step S10, the correction unit A obtains a damping force target value F* by multiplying a damping force target value F by the correction gain.

If the result of determination by the determination unit 25 changes at the time of selection of a correction gain G, it is permissible to decide the gain by causing a correction gain G that was selected before the change to fade out and causing a correction gain G to be selected after the change to fade in. For example, if the result of determination by the determination unit 25 changes from a determination that the damper D cannot exert a damping force that suppresses the sprung resonant frequency component of the stroke velocity Vd of the damper D to a determination that the damper D can exert a damping force that suppresses the sprung resonant frequency component of the stroke velocity Vd of the damper D, a correction gain G with a value of one, which was selected until then, is caused to fade out, and a correction gain G obtained by the change gain calculation unit 43a is caused to fade in. In this way, a sudden gain decrease can be alleviated, and a favorable ride quality of the vehicle can be maintained by avoiding a sudden change in the damping force of the damper D.

The multiplication unit 44 obtains a final damping force target value F* by multiplying the damping force target value F by the correction gain G. When the unsprung vibration level rW is high, the amplitude of the stroke velocity Vd of the vibrating damper D is also high, and hence a change ratio of the stroke velocity Vd is higher than when the unsprung vibration level rW is low. Therefore, when the unsprung vibration level rW is high, a change ratio of the damping force of the damper D becomes high, and the damping force changes significantly especially if the stroke velocity Vd is in a low-speed range, compared to when the unsprung vibration level rW is low. For this reason, if the correction gain G is decided only on the basis of the stroke velocity Vd regardless of a magnitude of the unsprung vibration level rW, there is a possibility that, in the case of a high below-spring vibration level rW, the value of the gain diverges from one so significantly that the damping force of the damper D undergoes a sudden change when the stroke velocity Vd is in the low-speed range.

In view of this, a correction gain map is prepared for each magnitude of the unsprung vibration level rW. For example, at least two correction gain maps are prepared for the vibration level r of 0.3 and the vibration level r of 0.6, respectively. Here, if the unsprung vibration level rW takes another value, the correction gain G is obtained by, for example, applying linear interpolation between the correction gain maps. It should be noted that the higher the unsprung vibration level rW, the higher the susceptibility to a sudden change in the damping force in the case of a large correction gain G when the stroke velocity Vd is in a low-speed range. Therefore, the correction gain G is set with respect to an arbitrary stroke velocity Vd such that, until the value of the correction gain G is saturated as described above, the higher the unsprung vibration level rW, the smaller the diversion of the value of the correction gain G from one.

As described above, the stroke velocity Vd is normalized in map calculation by the gain calculation unit 43 by providing the division unit 42. In this way, there is no need to prepare a large number of correction gain maps corresponding to below-spring vibration levels rW as long as one gain map M1 and one gain map M2 are prepared respectively for a case in which the damper D can exert a damping force that suppresses the sprung resonant frequency component of the stroke velocity Vd and for a case in which the damper D cannot exert a damping force that suppresses the sprung resonant frequency component of the stroke velocity Vd. Consequently, calculation is simplified and a storage capacity in the damper control device E can be reduced.

Furthermore, in a case where there is no need to avoid a sudden change in a damping force, a correction gain G may be obtained by preparing a map for obtaining an addition gain or a correction gain G from the stroke velocity Vd without performing normalization using an unsprung vibration level rW, instead of preparing correction gain maps corresponding to below-spring vibration levels rW. Although the gain maps M1, M2 have line symmetry with respect to the vertical axis, no limitation is intended in this regard.

It should be noted that the gain maps M1, M2 have line symmetry with respect to a line at zero on the vertical axis, and values obtained by applying map calculation based on the gain maps M1, M2 to a value of an arbitrary normalized stroke velocity Vd/rW have opposite signs from each other. Correction gains G are obtained by adding one to these values. A sum of the correction gains G is two. In the present embodiment, a damping property of the damper D is such that, with respect to an arbitrary stroke velocity Vd, a damping force has the same absolute value along the extension and compression of the damper D, and an extension-compression ratio, which is a ratio between an extension-side damping force and a compression-side damping force, is one. Therefore, provided that a correction gain G is obtained in the above-described manner, a sum of a value of the extension-side damping force and a value of the compression-side damping force of the damper D with respect to an arbitrary stroke velocity Vd has the same value before and after a damping force target value F is multiplied by the correction gain G. In this way, a damping force output in one stroke cycle of the damper D and an amount of energy absorption calculated using the stroke velocity Vd are equal before and after the damping force target value F is multiplied by the correction gain G. Regarding control of vibration of the unsprung member W, vibration of the unsprung member W can be suppressed sufficiently as long as the amount of energy absorption of the damper D is the same. Therefore, by achieving the same total amount of damping force before and after the damping force target value F is multiplied by the correction gain G as described above, a vibration damping amount that is necessary and sufficient for suppressing vibration of the unsprung member W is secured. As a result, control of vibration of the unsprung member W is not adversely affected.

Although a damping force target value F* provided to the driving unit 28, which actually drives the damping force adjustment unit 18 of the damper D, is obtained by multiplying the damping force target value F by the correction gain G in the present embodiment, a damping force target value F* may be obtained from a stroke velocity Vd and a damping property map that has been corrected by multiplying a damping property by the correction gain G. Furthermore, it is permissible to, for example, prepare several damping properties, select a damping property optimal for control of vibration of the unsprung member W in accordance with a value of an unsprung vibration level rW, obtain a damping force target value F on the basis of the selected damping property, and correct the damping force target value F using a correction gain G.

From the damping force target value F* obtained in the above-described manner, the control instruction value calculation unit 27 obtains a current value I for adjusting a damping coefficient for the damper D as a control instruction value to be given to the damping force adjustment unit 18. The driving unit 28 includes, for example, a PWM circuit and the like, and supplies an amount of current compliant with the current value I obtained by the control instruction value calculation unit 27 to the damping force adjustment unit 18. The driving unit 28 includes a compensator for PI compensation, PID compensation, and the like, and performs feedback control for current that flows into the damping force adjustment unit 18 so as to supply current compliant with the current value I to the damping force adjustment unit 18. It should be noted that the driving unit 28 may not perform feedback control.

In a case where the damper D can exert a damping force that suppresses the sprung resonant frequency component of the stroke velocity Vd, the damper control device E changes a damping property such that the damping force is larger than that of a base damping property. In a case where the damper D cannot exert a damping force that suppresses the sprung resonant frequency component of the stroke velocity Vd, the damper control device E changes a damping property such that the damping force is smaller than that of a base damping property.

That is to say, in a case where a damping force can be exerted in a direction for suppressing the sprung resonant frequency component of the stroke velocity Vd of the damper D, the damper control device E induces the damping force of the damper D to increase. In a case where a damping force is exerted in a direction for fostering the sprung resonant frequency component of the stroke velocity Vd of the damper D, the damper control device E induces the damping force of the damper D to decrease. In this way, not only the vibration of the unsprung member W can be controlled, but also the vibration in the sprung resonant frequency range can be suppressed.

Therefore, in order to control a damping force of the damper D for the purpose of controlling the vibration of the unsprung member W, the damper control device E suppresses the sprung resonant frequency component by correcting the damping force target value F so as to suppress vibration associated with the sprung resonant frequency component of the stroke velocity Vd of the damper D. Consequently, even if the road surface is an uneven wavy road, it is possible to make the sprung member B track the wavy road surface, that is to say, to improve the road surface tracking property, while suppressing the vibration of the unsprung member W. Therefore, a passenger of the vehicle can be prevented from feeling a sense of discomfort.

Furthermore, in a case where the vehicle passes over sporadic protrusions and convexities while running on a flat road surface, vibration of the unsprung member W is transmitted to the sprung member B, and vibration in a sprung resonant frequency range is excited in the sprung member B. At this time, the damper control device E can not only suppress the vibration of the sprung member B by suppressing the vibration associated with the sprung resonant frequency component of the stroke velocity Vd of the damper D, but also cause the sprung member B to track the flat road surface. Therefore, without performing skyhook control, the vibration of the sprung member B can be controlled on the same level as per a case where skyhook control is performed.

Furthermore, the damper control device E corrects the damping force target value F in a case where the vibrations of the sprung member B and the unsprung member W become large. Therefore, other controls are not affected, even when used in combination with control that is performed while running on a good road, which is a smooth road with few surface concavities and convexities, such as skyhook control and the like. It should be noted that, in a case where control according to the present embodiment is used in combination with other controls, it is sufficient to calculate a target damping force, compare it with a target damping force obtained through control according to the present embodiment, and select a target damping force with a larger value in other controls as well.

Furthermore, the correction gain G changes in accordance with the stroke velocity Vd of the damper D. The correction gain G changes in such a manner that it increases as the stroke velocity Vd of the damper D increases. In this way, especially when the stroke velocity Vd is in a low-speed range, a sudden change in the damping force of the damper D can be alleviated by reducing the correction gain G, and therefore the ride quality of the vehicle can be further improved. The correction gain G may be set to an arbitrary constant value equal to or larger than one in a case where the damper D can exert a damping force that suppresses the vibration of the sprung member B, and set to an arbitrary value equal to or smaller than one in a case where the damper D cannot exert such a damping force. A sudden change in the damping force of the damper D can be alleviated by setting the correction gain G to increase from 0 as an absolute value of the stroke velocity Vd increases from 0 in a case where the absolute value of the stroke velocity Vd is equal to or smaller than 0.3 m/s.

If the correction gain G is decided only on the basis of the stroke velocity Vd regardless of a magnitude of the unsprung vibration level rW, there is a possibility that, in the case of a high below-spring vibration level rW, the gain becomes so large that the damping force of the damper D undergoes a sudden change when the stroke velocity Vd is in the low-speed range. However, the correction gain G is set such that the higher the unsprung vibration level rW, the smaller the diversion of the value of the gain from one. Therefore, a sudden change in the damping force of the damper D can be alleviated when the unsprung vibration level rW is high and the stroke velocity Vd is in the low-speed range, and the ride quality of the vehicle can be further improved.

Furthermore, in a case where the damping force target value F is obtained by selecting one of a plurality of damping properties on the basis of the condition of vibration of the unsprung member W, vibration of the sprung member B can also be controlled with a selection of a damping property optimal for controlling the vibration of the unsprung member W. In this way, the vibration of the unsprung member W and the vibration of the sprung member B can be controlled together in a high level, and the ride quality of the vehicle can be further improved. A damping property may be selected, for example, on the basis of a parameter other than the unsprung vibration level rW, such as the stroke velocity Vd.

The final damping force target value F* is obtained by obtaining the damping force target value F of the damper D from a base damping property, and multiplying the damping force target value F by the correction gain G. Alternatively, the damping force target value F can be corrected as follows: an entire damping property is corrected by multiplying the damping property by the correction gain G, and the damping force target value F* is obtained from the corrected damping property. In this case, only the order of calculation is switched.

Although a damping property of the damper D is set such that a magnitude of a damping force is the same along the extension and compression of the damper D with respect to an arbitrary stroke velocity Vd, the present embodiment is applicable also to a damper that does not have such a damping property. In this case, an amount of damping force that is necessary and sufficient for suppressing vibration of the unsprung member W is secured by changing the damping property such that a total of an amount of damping force output during extension of the damper D and an amount of damping force output during compression of the damper D is the same. Therefore, control of vibration of the unsprung member W is not adversely affected.

Figure 10:
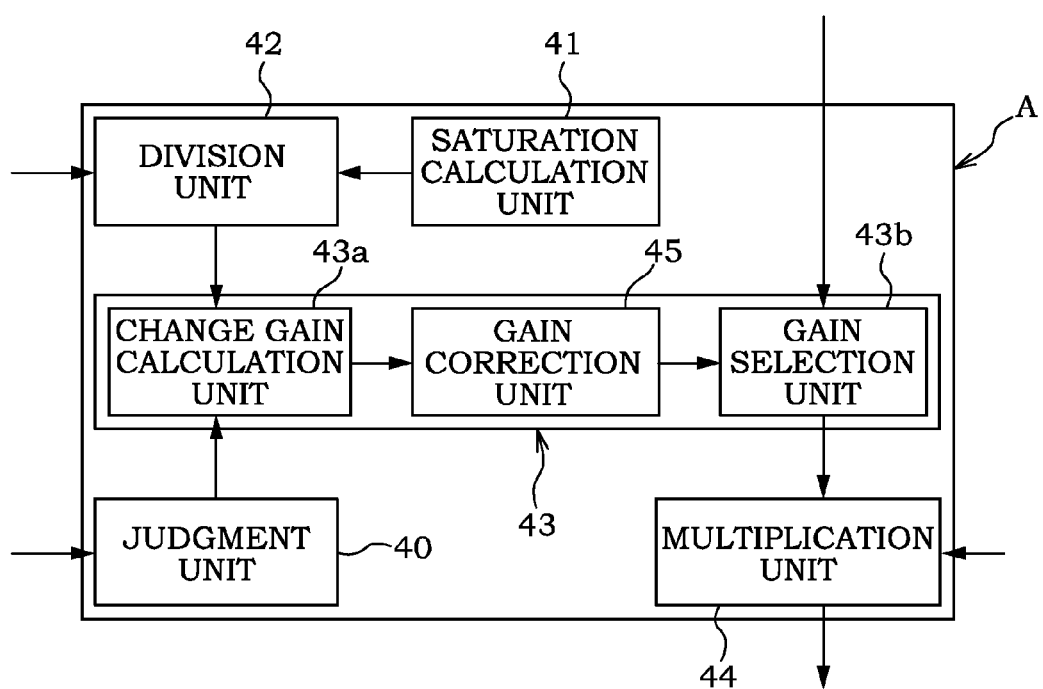
FIG. 10 shows a modification example of a the correction unit.

Furthermore, the correction gain G may be corrected using a value of the sprung resonant frequency component of the stroke velocity Vd of the damper D. For example, as shown in FIG. 10, the correction unit A includes a gain correction unit 45 subsequent to the change gain calculation unit 43a of the gain calculation unit 43. In a case where the value of the sprung resonant frequency component of the stroke velocity Vd of the damper D is small, the correction unit A multiplies the correction gain G by a gain correction coefficient that takes a value equal to or smaller than one. In this way, the extent of change in a damping coefficient is reduced by reducing the correction gain G for a case in which the sprung resonant frequency component of the stroke velocity Vd of the damper D has a small value. Especially, a sudden change in the damping force of the damper D is alleviated when a direction of the sprung resonant frequency component of the stroke velocity Vd of the damper D is inverted. As a result, ride quality of the vehicle can be further improved.

Figure 11:
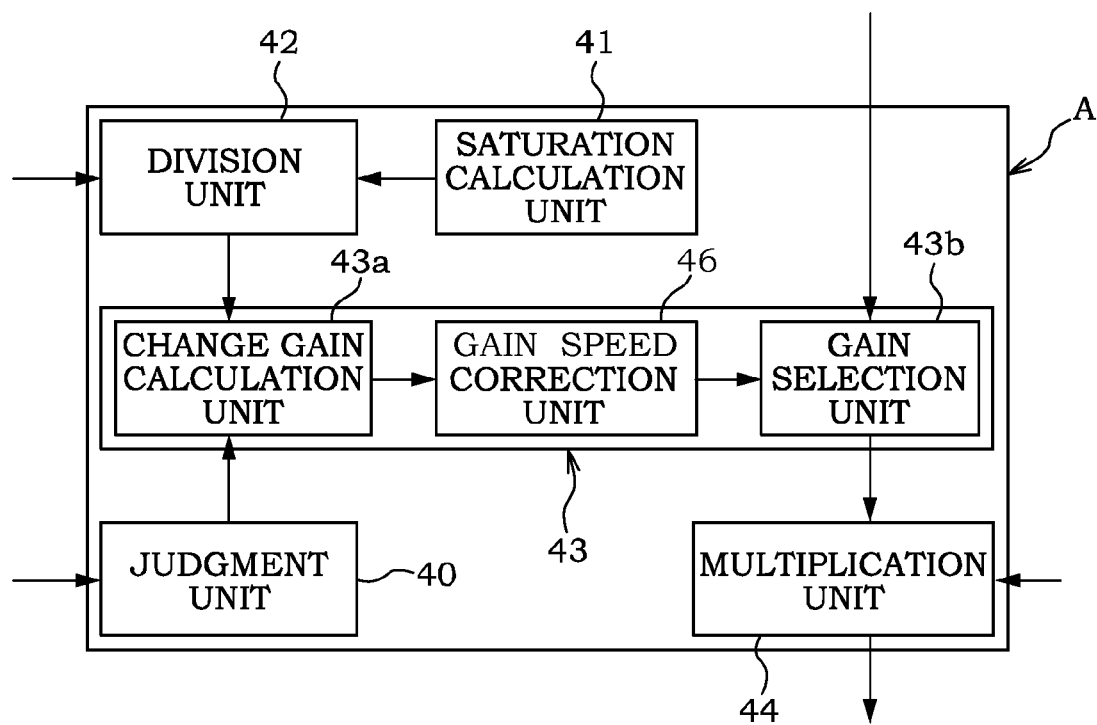
FIG. 11 shows a modification example of a the correction unit

Furthermore, it is permissible to correct a gain in accordance with a vehicle speed, independently from the above-described correction gain G. For example, as shown in FIG. 11, the correction unit A includes a gain speed correction unit 46 subsequent to the change gain calculation unit 43a of the gain calculation unit 43. The gain speed correction unit 46 corrects the correction gain G by multiplying the same by a speed correction coefficient that gradually increases as a vehicle speed increases. In this way, the sprung resonant frequency component of the stroke velocity Vd of the damper D can be suppressed in a manner suitable for the vehicle speed, and ride quality of the vehicle can be further improved. It should be noted that this gain correction based on the vehicle speed and the above-described gain correction based on the value of the sprung resonant frequency component of the stroke velocity Vd of the damper D may be set independently from each other, and both of the corrections may be executed.

This concludes the description of the embodiment of the present invention. It should be noted that the above-described embodiment merely illustrates one application example of the present invention, and is not intended to limit a technical scope of the present invention to specific configurations of the above-described embodiment.

For example, the damper control device E includes the following as hardware resources: an A/D converter for importing a signal output by a sensor unit; a storage device that stores therein a program used in processing necessary for detection of a vibration level and calculation of a current value I, such as a read-only memory (ROM); a calculation device that executes processing on the basis of the program, such as a central processing unit (CPU); and a storage device that provides a storage area to the CPU, such as a random-access memory (RAM). It is sufficient to realize the operations of the damper control device E by the CPU executing the program.

Furthermore, the unsprung vibration level rW of the unsprung member W is not limited to being detected through detection of a relative displacement between the cylinder 12 and the piston rod 14 detected by the stroke sensor 20. It may instead be detected by attaching a sensor to the unsprung member W, directly detecting the acceleration of the unsprung member W in the up-down direction, and obtaining a first reference value using the acceleration in the up-down direction. Also, the stroke sensor 20 may be integrated into the damper D.

This application claims priority based on Japanese Patent Application No. 2013-050133 filed with the Japan Patent Office on Mar. 13, 2013, the entire contents of which are incorporated into this specification.

The invention claimed is:

1. A damper control device for controlling vibration of an unsprung member by controlling a damping force of a damper interposed between a sprung member and the unsprung member of a vehicle on the basis of a damping property prepared in advance, the damper control device comprising:

a correction unit configured to extract a sprung resonant frequency component of a stroke velocity of the damper, and correct a damping force target value of the damper on the basis of the extracted sprung resonant frequency component, wherein the correction unit is configured to obtain a correction gain from the sprung resonant frequency component of the stroke velocity and vibration information of the damper, and obtain the damping force target value on the basis of the damping property and the correction gain.

2. The damper control device according to claim 1, wherein the correction unit is configured to perform correction to increase an absolute value of the damping force target value in a case where the sprung resonant frequency component of the stroke velocity is suppressible with the damping force of the damper, and perform correction to reduce the absolute value of the damping force target value in a case where the sprung resonant frequency component of the stroke velocity is not suppressible with the damping force of the damper.

3. A damper control device for controlling vibration of an unsprung member by controlling a damping force of a damper interposed between a sprung member and the unsprung member of a vehicle on the basis of a damping property prepared in advance, the damper control device comprising:

a correction unit configured to extract a sprung resonant frequency component of a stroke velocity of the damper, and correct a damping force target value of the damper on the basis of the extracted sprung resonant frequency component, wherein the correction unit is configured to perform correction to increase an absolute value of the damping force target value in a case where a direction of extension/compression of the damper matches a direction of the sprung resonant frequency component of the stroke velocity, and perform correction to reduce the absolute value of the damping force target value in a case where the direction of extension/compression of the damper does not match the direction of the sprung resonant frequency component of the stroke velocity.

4. The damper control device according to claim 1, wherein in a case where the stroke velocity is the same along extension and compression of the damper, the correction unit is configured to perform correction such that a sum of the damping force target value along the extension and the damping force target value along the compression is equal before and after the correction.

5. The damper control device according to claim 1, wherein the correction gain is configured to change in such a manner that the correction gain increases as the stroke velocity of the damper increases.

6. The damper control device according to claim 1, wherein the correction gain is configured to change on the basis of a vibration level representing a magnitude of the vibration of the unsprung member.

7. The damper control device according to claim 1, further comprising:

a sprung vibration level detection unit configured to detect a vibration level of the sprung member;

an unsprung vibration level detection unit configured to detect a vibration level of the unsprung member; and a determination unit configured to determine whether or not the correction unit needs to perform correction on the basis of the vibration level of the sprung member and the vibration level of the unsprung member, wherein the correction unit is configured to correct the damping force target value if the determination unit determines that the correction needs to be performed.

8. The damper control device according to claim 1, wherein the vibration information indicates a direction of the damping force of the damper.

* * * * *